(No Model.)

L. T. NEWELL.
GRIDIRON.

No. 318,493. Patented May 26, 1885.

Witnesses.  
S. McKee.  
G. Bodley.

Inventor.  
Lewis T. Newell.

UNITED STATES PATENT OFFICE.

LEWIS T. NEWELL, OF ALBANY, NEW YORK.

GRIDIRON.

SPECIFICATION forming part of Letters Patent No. 318,493, dated May 26, 1885.

Application filed October 24, 1883. (No model.)

*To all whom it may concern:*

Be it known that I, LEWIS T. NEWELL, of the city and county of Albany, State of New York, have invented certain new and useful Improvements in Gridirons, which are fully set forth in the following specification and accompanying drawings.

My invention relates to a broiler in which parallel grooved bars in conjunction with a gutter are employed.

The objects of my improvements are, first, to support the meat horizontally, so as to allow the lower surface to come in direct contact with the products of combustion; secondly, to save the juices of the meat; thirdly, to prevent the juices from dropping onto the fire or stove-tops.

Figure 1:
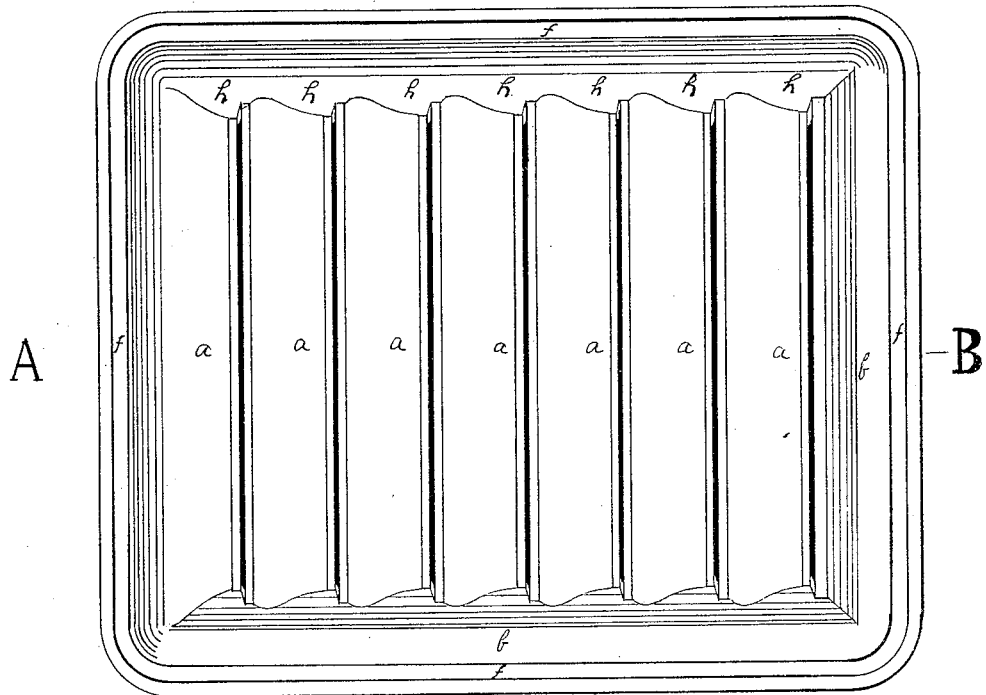
Figure 2:
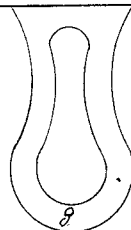
Figure 2:
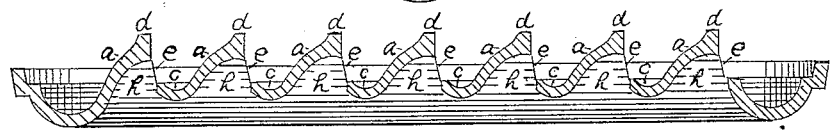
Figure 3:
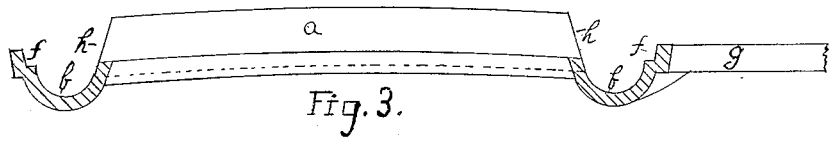
Figure 4:
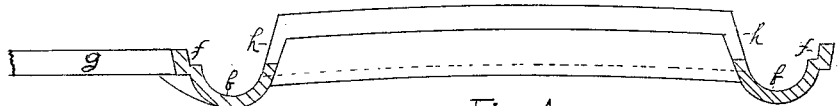

Figure 1 is a plan view of a broiler. Fig. 2 is a sectional elevation on a line crossing the bars. Fig. 3 is a sectional elevation on a line parallel with the bars, viewing it from A, Fig. 1. Fig. 4 is a sectional elevation on a line parallel with the bars, as seen from B, Fig. 1.

Similar letters refer to similar parts throughout the several views.

*a a* are the parallel bars, joined at their ends *h h* to the gutter *b b*, which form a frame therefor, and which retain the juice flowing from the grooves *c c* on the lower edge of the broiler-bars *a a*, the grooves *c c*, with the upper inclined surface of the bars *a a*, collecting it as it drops from the meat, which is laid onto the flanges *d d* at the upper edges of the broiler-bars *a a*, thereby presenting the under surface of the meat to the direct action of the heat.

*e e* are openings between the bars for the admission of the heat to the meat.

*f f* is a seat for receiving a cover.

*g* is the handle.

Fig. 2 shows the arrangement and form of the broiler-bars for gathering the juices of the meat, the lower and grooved edge placed nearly to or on a vertical line with the upper edge or side of the bar next to it, the intention being to place the bars so as to catch the dripping or flowing juices exuded from the meat when it rests on the flanges *d d*. Fig. 2 also shows the form of the bar *a a* on its under side. The spaces under and between the bars are closed at the ends, as shown at *h h*, making a finish for the ends of the bar and a connection with the gutter *b b*.

The gutter at the corners of the broiler can be utilized for spouts.

The dotted lines, Figs. 3 and 4, show the bottom of the grooves *c c* on the edge of the bars.

I am aware that prior to my invention broilers have been made with grooved bars and horizontal openings, also plain flat bars inclined in the direction of their width and having vertical openings.

I am also aware that broilers have been made provided with two duplicate grids, one above the other, the two grids or sections fitting together so that the bars of the upper section extend over the vertical edges of the lower section, and of a broiler the bars of which are made convex and concave, inclined transversely, so as to have the concave part of each form a gutter for the reception of the gravy from the convex part, the bars overlapping without touching. These old forms of construction and arrangement of bars in broilers I do not claim. In the broilers referred to and made prior to my invention less than one-half of the under surface of the meat is exposed to the direct action of the heat, as more than one-half of its under surface is in contact with the broiler-bars, the result being that the meat is cooked unevenly.

With a broiler made as illustrated by my drawings, having a narrow vertical flange projecting from the upper edge of each of its bars, practically the whole of the under surface of the meat is exposed to the direct action of the heat, the result being that the meat is evenly broiled.

What I claim as my invention, and desire to secure by Letters Patent of the United States, is—

1. In a broiler, a series of bars, *a*, each made inclined transversely, and having a groove, c, on its lower edge, and on its upper edge a vertical flange, d, as and for the purpose set forth.

2. In a broiler, the combination of the bars a a, made inclined transversely, having grooves c c on their lower edges, and on their upper edges vertical flanges d d, the bars arranged parallel, with the lower edge of each bar nearly to or in a vertical line with the bar next to it, the openings e e, and the receiving-gutter b, the whole constructed and combined as and for the purpose set forth.

LEWIS T. NEWELL.

Witnesses:
CHARLES SELKIRK,
HENRY SCHLINGLOFF.